T. J. HOOVER & J. T. HENDERSON.
PLOW.
No. 175,985. Patented April 11, 1876.
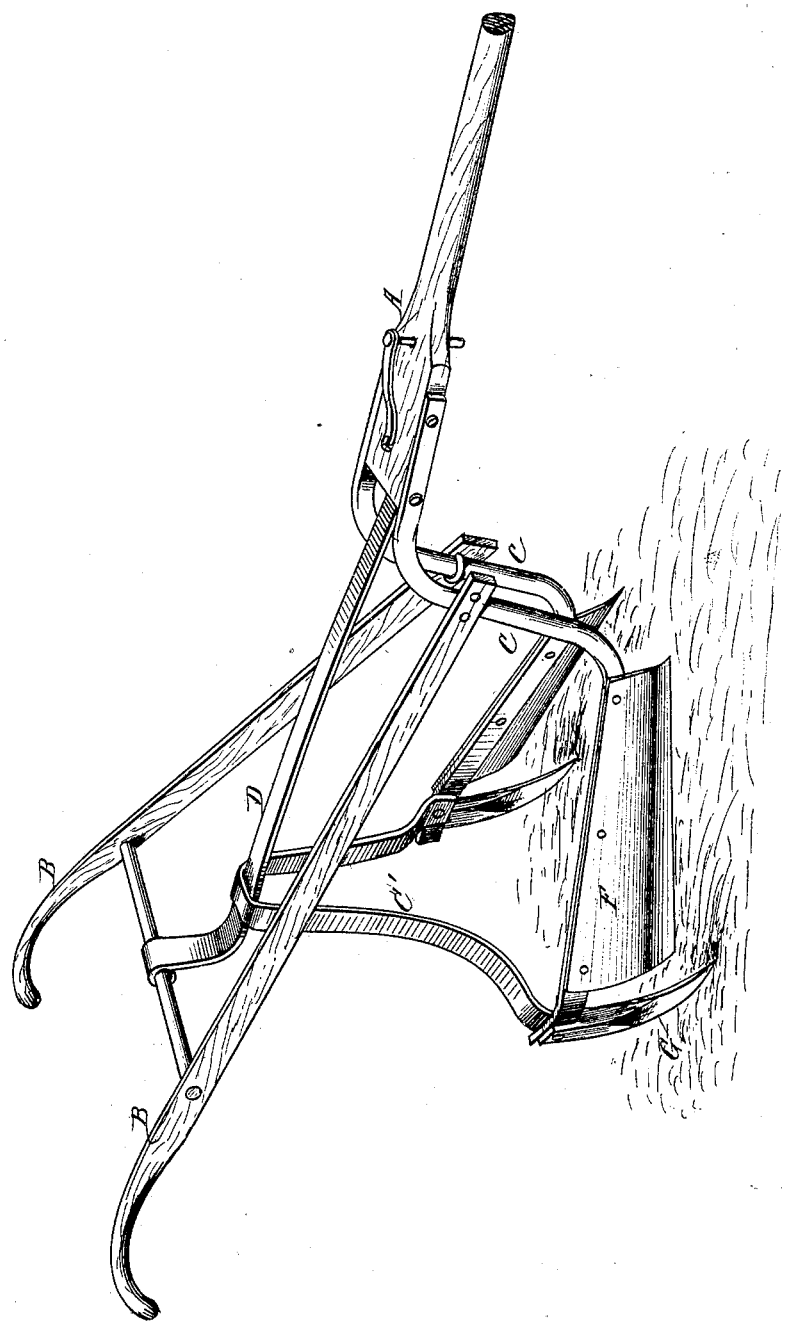

UNITED STATES PATENT OFFICE.

THOMAS J. HOOVER AND JAMES T. HENDERSON, OF WOODBURY, TENN.

IMPROVEMENT IN PLOWS.

Specification forming part of Letters Patent No. 175,985, dated April 11, 1876; application filed January 14, 1876.

*To all whom it may concern:*

Be it known that we, THOMAS J. HOOVER and JAMES T. HENDERSON, of Woodbury, in the county of Cannon and State of Tennessee, have invented certain new and useful Improvements in Plows, of which the following is a specification:

This invention relates to an improved cultivator for cutting and clearing away weeds, and pulverizing and smoothing and plowing the soil; and it consists in the combination with an ordinary cultivator provided with two or more plow-shares, of two hoes or scrapers setting in front of the plows and inclined outwardly toward the rear, in such manner as to clear and smooth the surface of the ground in front of the plow-shares, as hereinafter fully set forth and shown.

The drawing represents a perspective view of my invention, in which the letter A represents the plow-beam, and B the handles. To the rear end of the beam A are rigidly secured two bent arms, C C, extending downward and branching to the rear at an angle to each other, as shown. To the rear ends of said arms are attached the lower ends of a brace, C', the upper part of which is secured to the longitudinal bar D, forming a continuation of the beam A, the rear end of said bar being bent upward and attached to the crossbar E, uniting the rear portions of the handles. The front ends of said handles are secured in any convenient manner to the arms C C. To the horizontal lower ends of the bars C C are attached the hoe plates F, the lower edges of which are sharpened and curved outwardly, so as to form cutting-edges to remove the weeds and level the soil in advance of the plows G G, which are secured to the extreme ends of the arms C C.

The plates F F, instead of being permanently secured to the bars C C, may be slotted and secured to the same by means of screw-bolts in such manner as to admit of longitudinal adjustment, so that their position in relation to the plows may be changed at convenience.

The operation of our improved cultivator will be readily understood from the foregoing description. The hoes being set at an angle to the line of motion of the cultivator, will cut and throw to each side any weeds which they may meet in their course, and scrape and smooth the soil in advance of the plow which forms the furrows.

The apparatus as thus constructed forms a combined scraper and cultivator, which may be employed for cultivating either corn or cotton.

What we claim, and desire to secure by Letters Patent, is—

In combination with the beam A, handles B, and longitudinal bar D, the bent arms C C, brace C', shovels F, and plows G, substantially as herein set forth.

In testimony that we claim the foregoing, we have hereunto set our hands in the presence of the subscribing witnesses.

THOMAS J. HOOVER.
JAS. T. HENDERSON.

Witnesses:
A. N. FISHER,
F. B. MARTIN.